United States Patent
Yang (10) Patent No.: US 7,515,217 B2
(45) Date of Patent: *Apr. 7, 2009

(54) FABRICATING METHOD OF A PIXEL STRUCTURE HAVING ELECTRICAL FIELD SHIELDING LAYER AND STORAGE CAPACITOR WITH THREE TRANSPARENT ELECTRODES

(75) Inventor: Chien-Sheng Yang, Hsinchu County (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/309,825

(22) Filed: Oct. 4, 2006

(65) Prior Publication Data

US 2007/0076156 A1    Apr. 5, 2007

Related U.S. Application Data

(62) Division of application No. 10/708,016, filed on Feb. 3, 2004, now Pat. No. 7,142,260.

(30) Foreign Application Priority Data

Dec. 5, 2003    (TW)    ............... 92134284 A (51) Int. Cl.
    *G02F 1/1343*    (2006.01)
(52) U.S. Cl. .......................................... 349/39; 349/38
(58) Field of Classification Search .................... 349/38, 349/39
    See application file for complete search history.

(56) References Cited

U.S. PATENT DOCUMENTS

| 5,446,562 | A  | * | 8/1995  | Sato ............................. 349/42 |
| 5,673,127 | A  | * | 9/1997  | Takahara et al. ............. 349/140 |
| 5,917,563 | A  | * | 6/1999  | Matsushima ................. 349/38 |
| 6,115,088 | A  | * | 9/2000  | Zhang et al. .................. 349/39 |
| 6,690,031 | B1 | * | 2/2004  | Ohtani et al. ................. 257/71 |
| 7,196,746 | B2 | * | 3/2007  | Yang ............................. 349/39 |
| 2002/0063810 | A1 | * | 5/2002  | Nakajima ..................... 349/39 |
| 2002/0171780 | A1 | * | 11/2002 | Zhang et al. .................. 349/39 |
| 2003/0007107 | A1 | * | 1/2003  | Chae et al. .................... 349/43 |
| 2003/0089909 | A1 | * | 5/2003  | Miyairi et al. ................ 257/59 |

* cited by examiner

*Primary Examiner*—Andrew Schechter
(74) *Attorney, Agent, or Firm*—Jianq Chyun IP Office (57) ABSTRACT

A fabricating method of a pixel structure is disclosed. The pixel structure is disposed on a substrate. The pixel structure comprises a scan line, a data line, an active element, a capacitor electrode, a pixel electrode and an electric field shielding layer. The fabricating method of the pixel structure comprises forming the scan line, the data line and the active element on the substrate first. The scan line and the data line are electrically coupled to the active element. Then, the capacitor electrode and the electric field shielding layer are formed on the substrate. Finally, the pixel electrode is formed on the substrate, covering the capacitor electrode and electrically coupled to the active element. The pixel electrode and the capacitor electrode form a pixel storage capacitor. The electric field shielding layer can avoid the interference between the data line and the pixel electrode.

10 Claims, 7 Drawing Sheets

FABRICATING METHOD OF A PIXEL STRUCTURE HAVING ELECTRICAL FIELD SHIELDING LAYER AND STORAGE CAPACITOR WITH THREE TRANSPARENT ELECTRODES

CROSS-REFERENCE TO RELATED APPLICATION

This is a divisional application of patent application Ser. No. 10/708,016, filed on Feb. 3, 2004, which claims the priority benefit of Taiwan patent application serial no. 92134284, filed on Dec. 5, 2003 and is now allowed. The entirety of each of the above-mentioned patent applications is hereby incorporated by reference herein and made a part of this specification.

BACKGROUND OF THE INVENTION

1. Field of the Invention

The present invention relates to a fabricating method of a structure of a pixel, and more particularly to a structure of a pixel with an electrical field shielding layer between a data line and a pixel electrode for avoiding the interference between the data line and the pixel electrode, and a fabricating method thereof.

2. Description of the Related Art

Thin Film Transistor Liquid Crystal Display (TFT LCD) comprises a thin film transistor array substrate, a color filter array substrate and a liquid crystal layer. The thin film transistor array substrate is composed of a plurality of pixels arranged in arrays. Each pixel comprises a thin film transistor, a pixel electrode and pixel storage capacitor. The thin film transistor comprises a gate terminal, a channel, a drain terminal and a source terminal, which are used to control the device. When the pixel electrode is in on-state, a signal is written into the pixel; when in off-state, a pixel storage capacitor can maintain the potential required for driving the device. Therefore, the capacitance of the pixel storage capacitor is closely related with the performance of the liquid crystal display.

In the prior art pixel storage capacitor of the pixel comprises a first metal layer, a second metal layer and a dielectric layer therebetween. Whether it is a Cst-on-gate structure or a Cst-on-common structure, the gate terminal or the common line, i.e. the first metal layer, serves as an electrode; the second metal layer and the pixel electrode electrically coupled thereto serve as another electrode. However, because the prior pixel storage capacitor uses the opaque metal layer as the capacitor electrode, it substantially reduces the aperture ratio of the pixel storage capacitor, reducing brightness of the displays.

Figure 1:
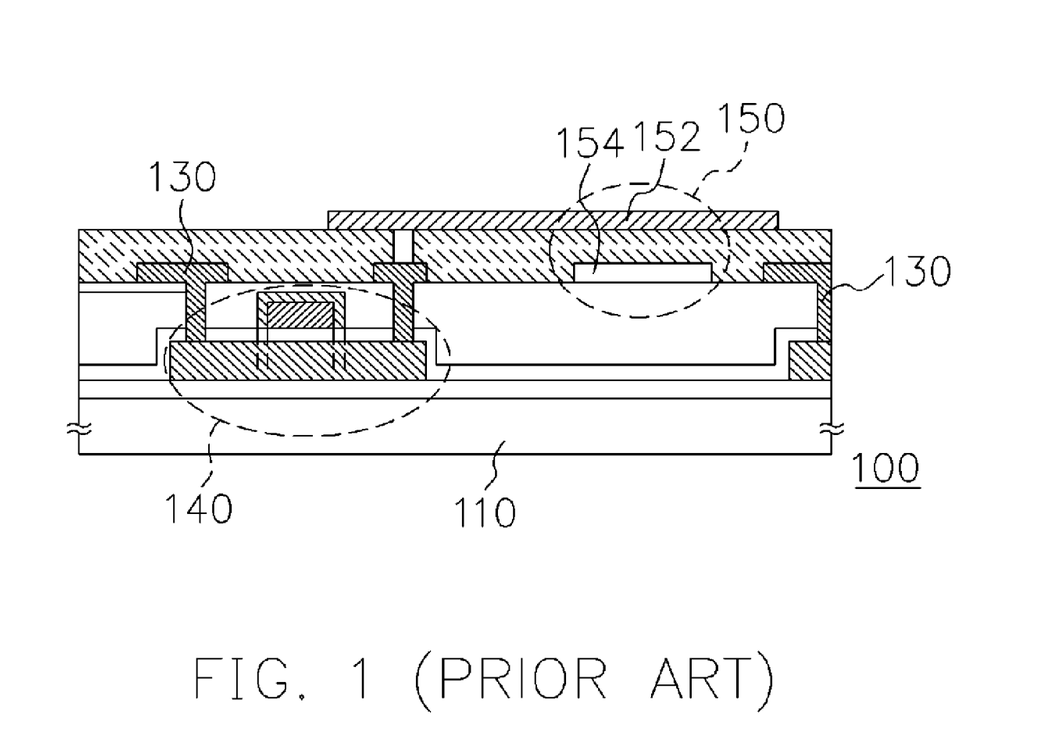
FIG. 1 is a schematic cross-sectional view showing a conventional structure of a pixel.

For solving the issue of reduction of the aperture ratio of the pixel, another structure of a pixel is disclosed by a prior art. FIG. 1 is a schematic cross-sectional view showing the structure of the pixel. Referring to FIG. 1, a pixel 100 is disposed on a substrate 110. The pixel 100 comprises a scan line (not shown), a data line 130, an active element 140 and a pixel storage capacitor 150. The scan line and the data line 130 are disposed on the substrate 110. The active element 140 is disposed on the substrate 110 and near to the intersection of the scan line and the data line 130. The pixel storage capacitor 150 comprises a pixel electrode 152 and a transparent capacitor electrode 154. The pixel electrode 152 is electrically coupled to the active element 140.

Because the pixel electrode 152 and the transparent capacitor electrode 154 of the pixel storage capacitor 150 are made from transparent materials, the pixel storage capacitor 150 does not result in the reduction of aperture ratio in pixel 100. However, the capacitance of the structure is reduced because of the shrinkage thereof. If the distance between the pixel electrode 152 and the transparent electrode 154 is reduced, the capacitance of the pixel storage capacitor 150 is enhanced, but the interference between the pixel electrode 152 and the data line 130 arises, resulting in the worse performance of the liquid crystal displays.

SUMMARY OF THE INVENTION

Therefore, an object of the present invention is to provide a structure of a pixel and a fabricating method thereof to solve the problems due to interference between the pixel electrode and the data line.

Another object of the present invention is to provide a structure of a pixel and a fabricating method thereof to increase the aperture ratio of the pixel.

Yet another object of the present invention is to provide a simple method of forming a structure of a pixel structure.

A further object of the present invention is to provide a structure of a pixel and a fabricating method thereof to increase the capacitance of the pixel storage capacitor.

In accordance with the objects above, the present invention discloses a structure of a pixel comprising a scan line, a data line, an active element, a capacitor electrode, a pixel electrode and an electrical field shielding layer. The scan line and the data line are disposed on the substrate. The active element is disposed on the substrate and near to an intersection of the scan line and the data line, and electrically coupled to the scan line and the data line. The capacitor electrode is disposed on the substrate. The pixel electrode is disposed over the capacitor electrode, and the pixel electrode is electrically coupled to the active element. The pixel electrode and the capacitor electrode form a pixel storage capacitor. The electrical field shielding layer is disposed between the data line and the pixel electrode.

In addition, the active element is, for example, a low temperature polysilicon (LTPS) thin film transistor. The pixel structure further comprises, for example, a source/drain conductive layer. The active element is electrically coupled to the data line and the scan line, for example, through the source/drain conductive layer. Or, the structure of the pixel further comprises a conductive layer. The active element is electrically coupled to the data line, for example, through the source/drain conductive layer, and the pixel electrode is, for example, directly electrically coupled to the active element. The conductive layer is indium tin oxide (ITO) of indium zinc oxide (IZO).

In addition, the active element can be an amorphous silicon thin film transistor. The active element, for example, comprises a gate terminal, a channel and a source/drain terminal. The gate terminal is disposed on the substrate, and electrically coupled to the scan line. The channel is, for example, disposed over the gate terminal. The source/drain terminal is, for example, disposed on the channel, and electrically coupled to the data line and the pixel electrode.

Moreover, the pixel structure further comprises, for example, at least one transparent capacitor electrode, which is disposed between the capacitor electrode and the pixel electrode. The capacitor electrode, the transparent capacitor electrode and the pixel electrode form the pixel storage capacitor, and the capacitor electrode is formed of a transparent material. The capacitor electrode or transparent electrode is directly, or through the pixel electrode, electrically coupled to the active element. The transparent electrode is formed of ITO or IZO.

In the pixel of the present invention, the capacitor electrode, the electrical field shielding layer and the pixel electrode are formed of, for example, ITO or IZO.

According to the objects above, the present invention provides a method of fabricating a structure of a pixel. The method comprises: sequentially forming an active element, a scan line and a data line on a substrate, wherein the active element is electrically coupled to the scan line and the data line; forming a capacitor electrode on the substrate; forming an electrical field shielding layer on the substrate, covering the data line; and forming a pixel electrode on the substrate, covering the capacitor electrode and electrically coupling to the active element, wherein the pixel electrode and the capacitor electrode are coupled as a pixel storage capacitor.

In addition, the electrical field shielding layer and the capacitor electrode are formed, for example, from a patterned material layer.

Moreover, the active element is, for example, a low temperature polysilicon thin film transistor. Accordingly, the method further comprises forming a source/drain conductive layer over the active element while forming the data line. The active element is electrically coupled to the data line and the pixel electrode, for example, through the source/drain conductive layer. In some embodiments, a conductive layer is formed over the active element after the data line is formed. The active element is, for example, electrically coupled to the data line through the conductive layer, and the pixel electrode is, for example, directly electrically coupled to the active element. The conductive layer and the pixel electrode are formed, for example, from the same patterned material layer. The step of the forming the active element comprises, for example, forming a polysilicon layer on the substrate; forming a gate dielectric layer on the substrate, covering the polysilicon layer; forming a gate terminal on the gate dielectric layer and over the polysilicon layer; and forming a source/drain doped region within the polysilicon layer beside the gate terminal.

Moreover, the step of forming the source/drain doped region is performed by using the gate terminal as a hard mask in a doping process for forming the source/drain doped region in the polysilicon layer.

Moreover, the active element can also be an amorphous silicon thin film transistor. Accordingly, the step of forming the active element comprises: forming a gate terminal on the substrate, electrically coupled to the scan line; forming a gate dielectric layer on the substrate, covering the gate terminal; forming a channel on the gate dielectric layer and over the gate terminal; and forming a source/drain terminal on the channel.

In addition, before the capacitor electrode is formed and after the pixel electrode is formed, the method further comprises, for example, forming at least one transparent capacitor electrode. The electrical field shielding layer is formed with, for example, the capacitor electrode or the transparent capacitor electrode from the same patterned material layer.

In the fabricating method the pixel structure of the present invention, the capacitor electrode, the electrical field shielding layer and the pixel electrode are formed of, for example, ITO or IZO.

Accordingly, the structure of the pixel of the present invention and the fabricating method thereof have following advantages: (1) The pixel electrode and the data line do not interfere with each other. (2) The process can be simplified. (3) The transparent material of the pixel storage capacitor can substantially improve the aperture ratio. (4) The multi-layer pixel storage capacitor has desired capacitance. (5) They are adapted for the high-resolution liquid crystal displays.

In order to make the aforementioned and other objects, features and advantages of the present invention understandable, a preferred embodiment accompanied with figures is described in detail below.

DETAILED DESCRIPTION OF EMBODIMENTS

Figure 2A:
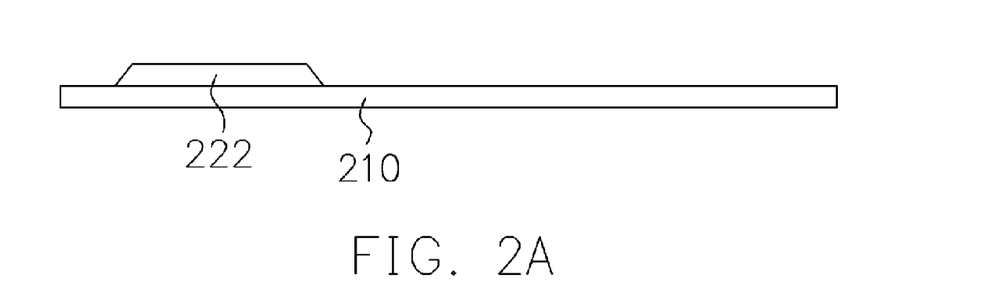
FIGS. 2A-2E are a schematic cross-sectional process flow showing a method of fabricating a structure of a pixel structure according to a first preferred embodiment of the present invention.
Figure 2B:
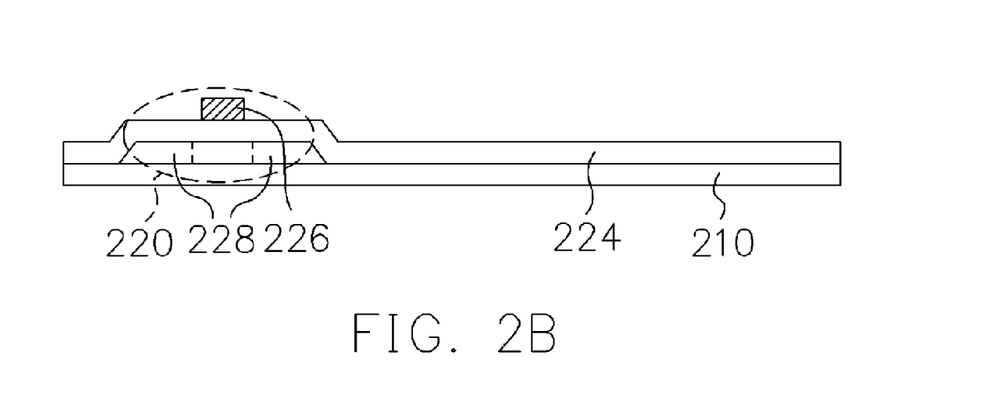

FIGS. 2A-2E are a schematic cross-sectional process flow showing a method of fabricating a structure of a pixel according to a first preferred embodiment of the present invention. Referring to FIGS. 2A and 2B, an active element 220 and a scan line (not shown) are formed on the substrate 210. The active element 220 is, for example, a low temperature polysilicon thin film transistor. The step of forming the active element 220 comprises, for example, first forming a polysilicon layer 222 on the substrate 210. Before the polysilicon layer 222 is formed, the step further comprises, for example, forming a buffer layer (not shown) on the substrate 210 for preventing ion contamination in the polysilicon layer 222 from the substrate 210. The polysilicon layer 222 is formed from an amorphous silicon layer by, for example, a thermal annealing process. Then, a gate dielectric layer 224 is selectively formed on the substrate 210 for covering the polysilicon layer 222. A gate terminal 226 is formed on the gate dielectric layer 224, and over the polysilicon layer 222. Finally, a doping process is performed by using, for example, the gate terminal 226 as a hard mask for forming a source/drain doped region 228 within the polysilicon layer 222. Moreover, the gate terminal 226 of the active element 220 is electrically coupled to the scan line.

Figure 2C:
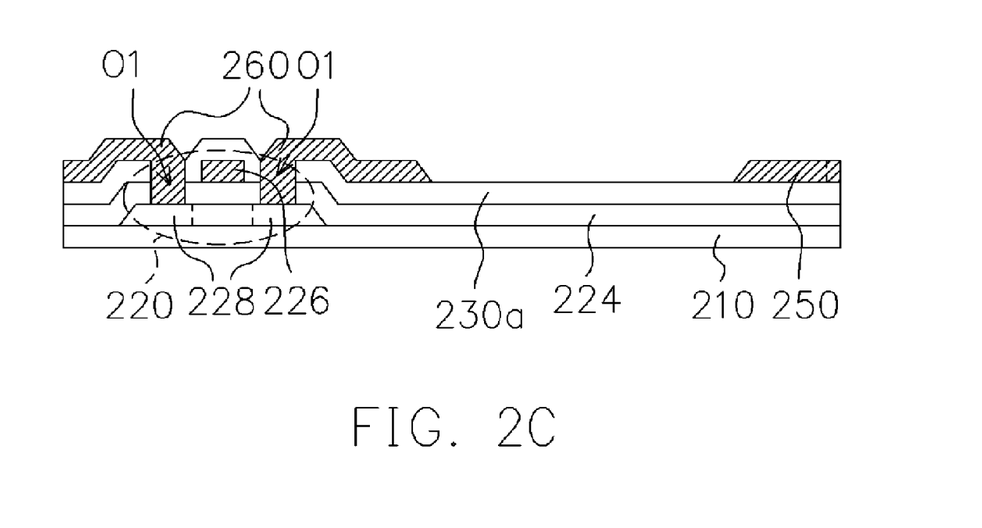

Referring to FIG. 2C, a photolithographic process is performed for forming a plurality of first contact windows O1 on the source/drain doped region 228 of the active element 220. Then, a data line 250 and a source/drain conductive layer 260 are formed from the same patterned metal layer. The data line 250 is electrically coupled to the source/drain conductive layer 260, and the source/drain conductive layer 260 fills the first contact windows O1 and is electrically coupled to the active element 220. In addition, before the first contact windows O1 are formed, the method further comprises, for example, forming a first protective layer 230a for covering the active element 220.

Figure 2D:
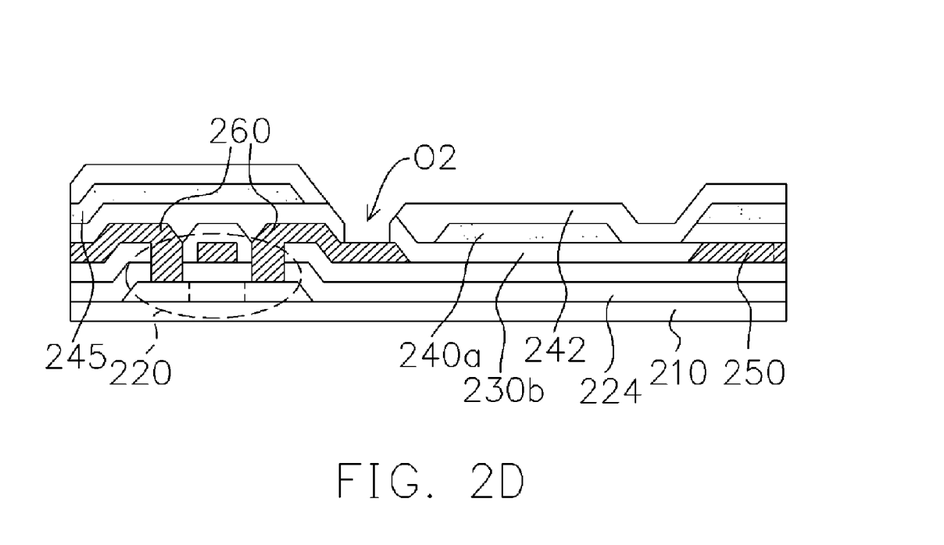

Referring to FIG. 2D, a capacitor electrode 240a and an electrical field shielding layer 245 are formed on the substrate 210. The capacitor electrode 240a and the electrical field shielding layer 245 are formed from the same patterned material layer, and the electrical field shielding layer 245 covers, for example, a portion of the active element 220. Then, a dielectric layer 242 is formed on the substrate 210, covering the capacitor electrode 240a. Another photolithographic process is performed to form a second contact window O2 on the source/drain conductive layer 260. In addition, before the capacitor electrode 240a is formed, the method further comprises, for example, forming a second protective layer 230b, covering the data line 250 and the source/drain conductive layer 260.

Figure 2E:
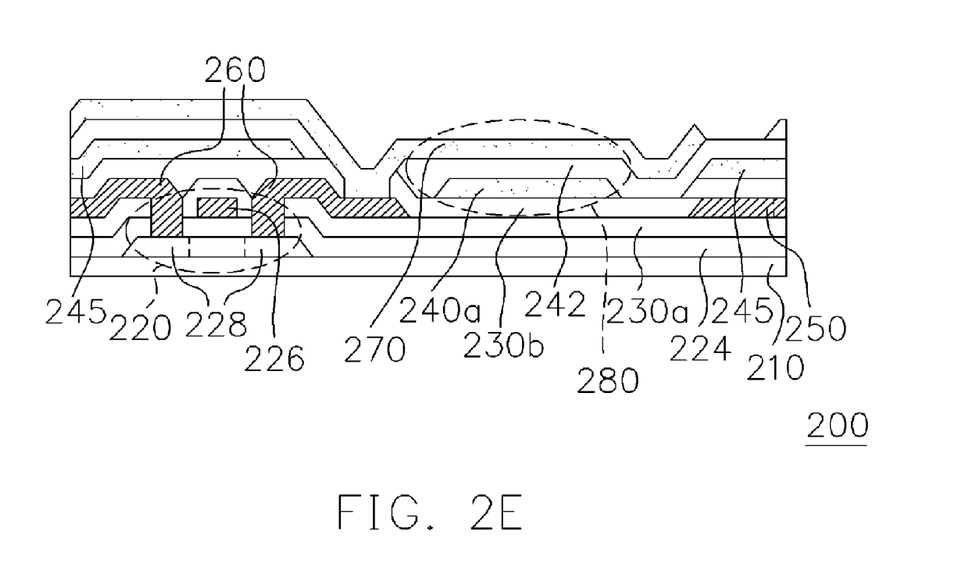

Referring to FIG. 2E, a pixel electrode 270 is formed on the dielectric layer 242 over the capacitor electrode 240a. Moreover, the pixel electrode 270 fills the second contact window O2 for electrically connecting the source/drain conductive layer 260 and is electrically coupled to the active element 220. The pixel electrode 270 and the capacitor electrode 240a form a pixel storage electrode 280. In addition, the pixel electrode 270 is extended over, for example, the active element 220. Accordingly, the pixel electrode 270 and the electrical field shielding layer 245 over the active element 220 also serves for storing charges.

Following are the descriptions of the first preferred pixel structure of the present invention. Referring to FIG. 2E, the pixel structure 200 is disposed on the substrate 210. The pixel structure 200 comprises the scan line (not shown), the data line 250, the active element 220, the capacitor electrode 240a, the pixel electrode 270 and the electrical field shielding layer 245. The scan line and the data line 250 are disposed on the substrate 210. The active element 220 is disposed on the substrate 210 and close to the intersection of the scan line and the data line 250. The active element 220 is electrically coupled to the scan line and the data line 250. The capacitor electrode 240a is disposed on the substrate 210. The pixel electrode 270 is disposed on the capacitor electrode 240a, and electrically coupled to the active element 220. The pixel electrode 270 and the capacitor electrode 240a form the pixel storage capacitor 280. It should be noted that the electrical field shielding layer 245 between the data line 250 and the pixel electrode 270 is adapted to prevent the interference between the data line 250 and the pixel electrode 270. Additionally, the pixel electrode 270 extends over, for example, the active element 220. Accordingly, the pixel electrode 270 and the electrical field shielding layer 245 over the active element 220 also serves for storing charges.

Moreover, the pixel 200 further comprises, for example, the source/drain conductive layer 260. The active element 220 is electrically coupled to the data line 250 and the pixel electrode 270 through the source/drain conductive layer 260. The electrical field shielding layer 245, the pixel electrode 270 and the capacitor electrode 240a are made from, for example, ITO or IZO.

Figure 3A:
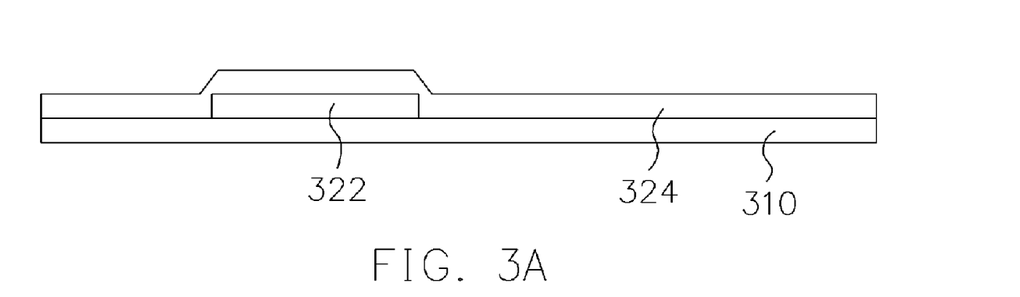
FIGS. 3A-3E are a schematic cross-sectional process flow showing a method of fabricating a structure of a pixel according to a second preferred embodiment of the present invention.
Figure 3B:
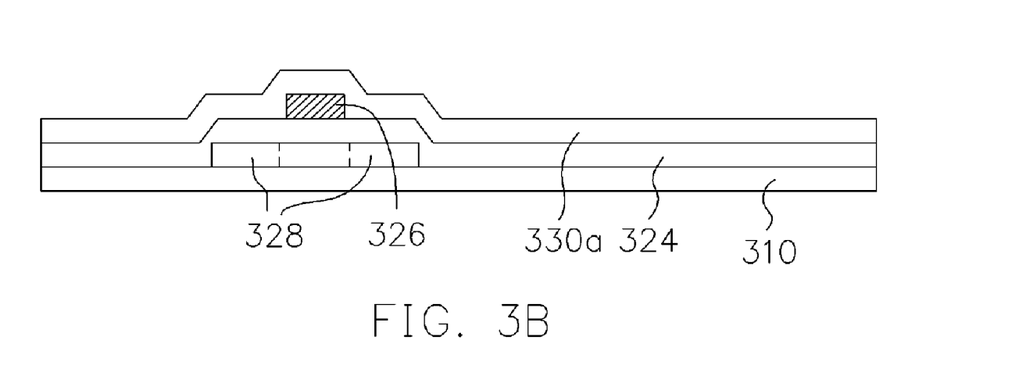

FIGS. 3A-3E show a schematic cross-sectional process flow of a method of fabricating a structure of a pixel according to a second preferred embodiment of the present invention. Referring to FIGS. 3A and 3B, an active element 320 and a scan line (not shown) are formed on the substrate 310. The active element 320 is, for example, a low temperature polysilicon thin film transistor. The step of forming the active element 320 comprises, for example, first forming a polysilicon layer 322 on the substrate 310. Before the polysilicon layer 322 is formed, the step further comprises, for example, forming a buffer layer (not shown) on the substrate 310 for preventing ion contamination in the polysilicon layer 322 from the substrate 310. The polysilicon layer 322 is formed from an amorphous silicon layer by, for example, an annealing process. Then, a gate dielectric layer 324 is selectively formed on the substrate 310 for covering the polysilicon layer 322. A gate terminal 326 is formed on the gate dielectric layer 324, and over the polysilicon layer 322. Finally, a doping process is performed by using, for example, the gate terminal 326 as a hard mask for forming a source/drain doped region 328 within the polysilicon layer 322. The gate terminal 326 of the active element 320 is electrically coupled to the scan line. Moreover, the method further comprises forming a first protective layer 330a, covering the active element 320.

Figure 3C:
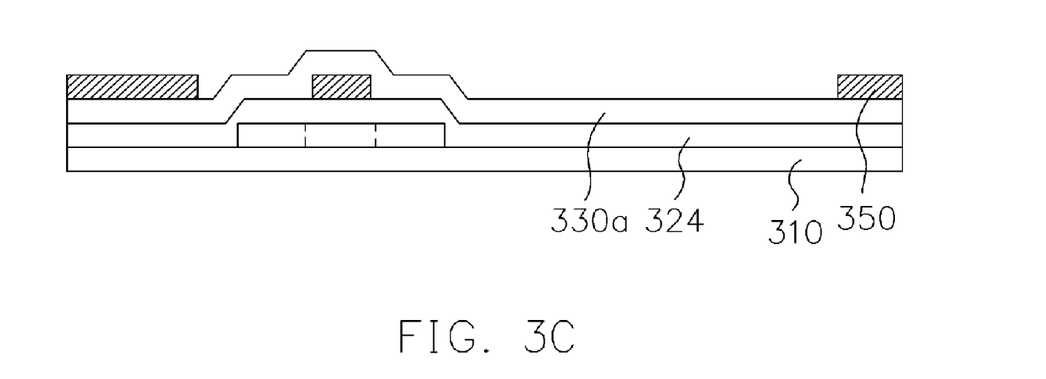

Referring to FIG. 3C, a data line 350 is formed on the substrate 310.

Figure 3D:
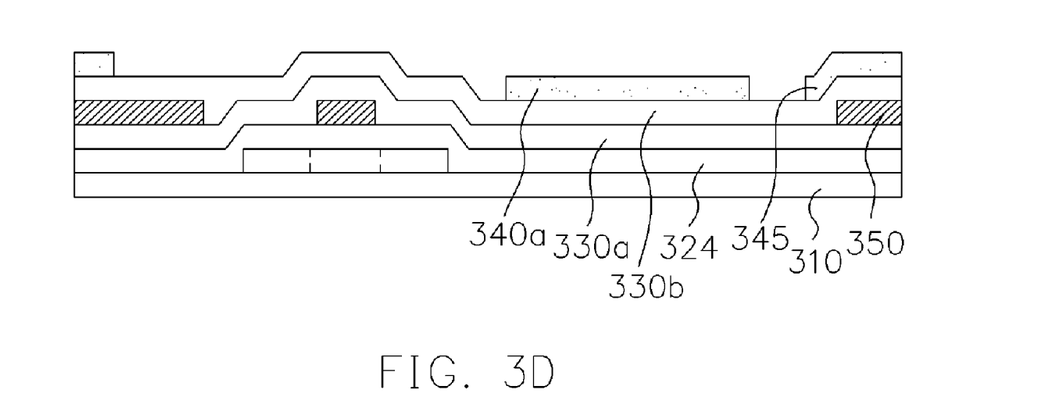

Referring to FIG. 3D, a capacitor electrode 340a and an electrical field shielding layer 345 are formed on the substrate 310. In addition, before the capacitor electrode 340a and the electrical field shielding layer 345 are formed, the method further comprises forming, for example, a second protective layer 330b, covering the data line 350.

Figure 3E:
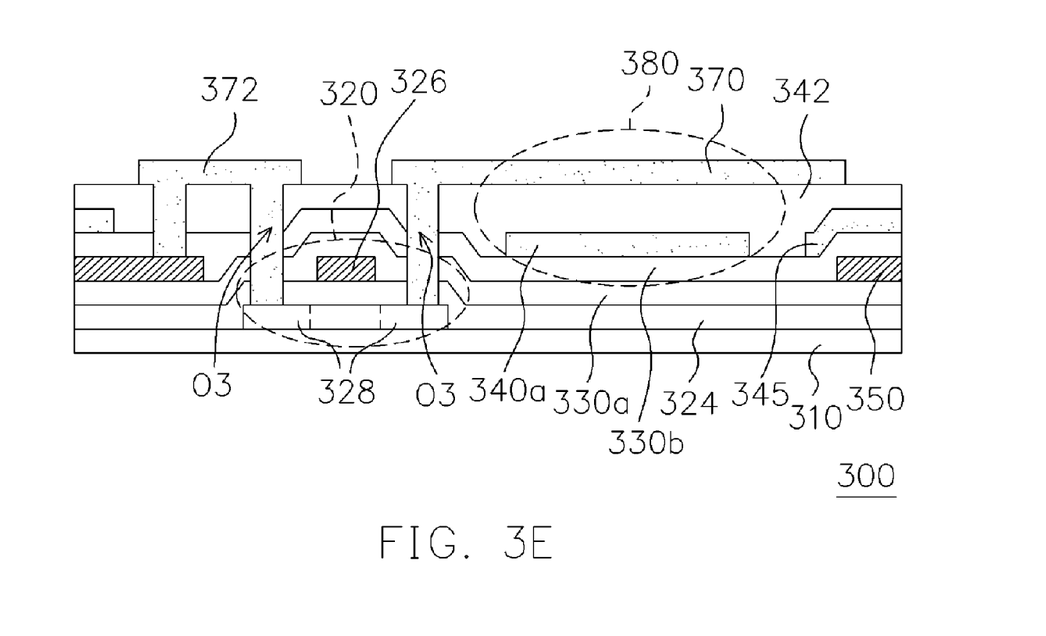

Referring to FIG. 3E, a dielectric layer 342 is formed on the substrate 310, covering the capacitor electrode 340a and the electrical field shielding layer 345. A photolithographic process is performed to form a plurality of contact windows O3 on the source/drain doped region 328 and the data line 350. Then, a transparent material is patterned for forming a pixel electrode 370 on the dielectric layer 342 over the capacitor electrode 340a, and a conductive layer 372 on the dielectric layer 342 over the source/drain doped region 328 and the data line 350. Moreover, the pixel electrode 370 and the conductive layer 372 fill the contact windows O3. The pixel electrode 370 electrically connects the source/drain doped region 328 of the active element 320, and the conductive layer 372 is electrically coupled to data line 350 and the source/drain doped region 328 of the active element 320. The pixel electrode 370 and the capacitor electrode 340a form the pixel storage capacitor 380.

Following are the descriptions of the second preferred pixel structure of the present invention. Referring to FIG. 3E, the pixel structure 300 is disposed on the substrate 310. The pixel structure 300 comprises the scan line (not shown), the data line 350, the active element 320, the capacitor electrode 340a, the pixel electrode 370 and the electrical field shielding layer 345. The scan line and the data line 350 are disposed on the substrate 310. The active element 320 is disposed on the substrate 310 and close to the intersection of the scan line and the data line 350. The active element 320 is electrically coupled to the scan line and the data line 350.

The capacitor electrode 340a is disposed on the substrate 310. The pixel electrode 370 is disposed on the capacitor electrode 340a, and electrically coupled to the active element 320. The pixel electrode 370 and the capacitor electrode 340a form the pixel storage capacitor 380. It should be noted that the electrical field shielding layer 345 between the data line 350 and the pixel electrode 370 is adapted to prevent the interference between the data line 350 and the pixel electrode 370. Additionally, the pixel 300 further comprises, for example, the conductive layer 372. The active element 320 is electrically coupled to the data line 350, for example, through the conductive layer 372. The pixel electrode 370 is directly electrically coupled to the active element 320. The electrical field shielding layer 345, the pixel electrode 370, the conductive layer 372 and the capacitor electrode 340a are formed from, for example, ITO or IZO.

Figure 4:
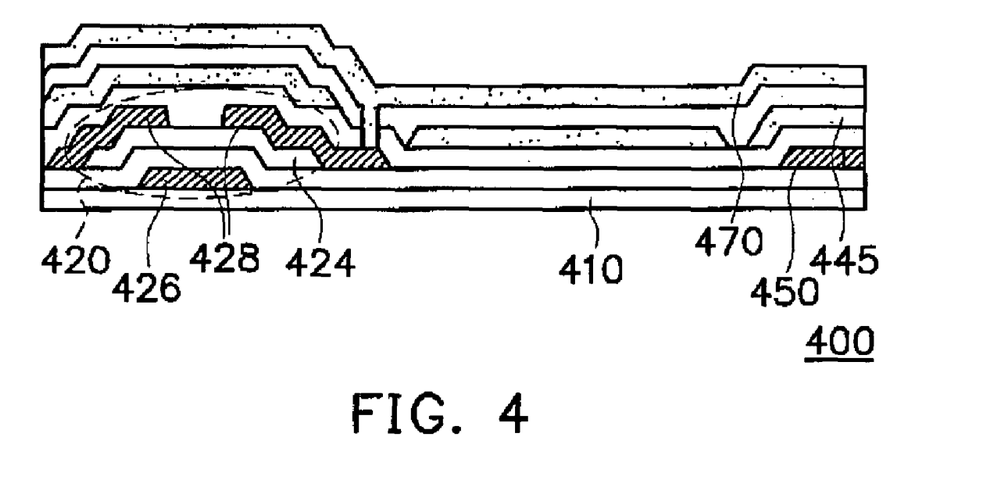
FIG. 4 is a schematic cross-sectional view showing a structure of a pixel according to a third preferred embodiment of the present invention.

FIG. 4 is a schematic cross-sectional view showing a structure of a pixel according to a third preferred embodiment of the present invention. Referring to FIG. 4, the structure of the pixel 400 is different from the embodiments described above in the active element 420 which is an amorphous silicon thin film transistor, wherein an electrical field shielding layer 445 is disposed between the data line 450 and the pixel electrode 470. The elements similar to those described in the prior embodiments are not repeated hereinafter. The active element 420 comprises, for example, a gate terminal 426, a channel 424 and a source/drain terminal 428. The gate terminal 426 is disposed, for example, on the substrate 410, and electrically coupled to the scan line (not shown). The channel 424 is disposed, for example, over the gate terminal 426. The source/drain terminal 428 is disposed, for example, on the channel 424, and electrically coupled to the data line 450 and the pixel electrode 470.

Figure 5:
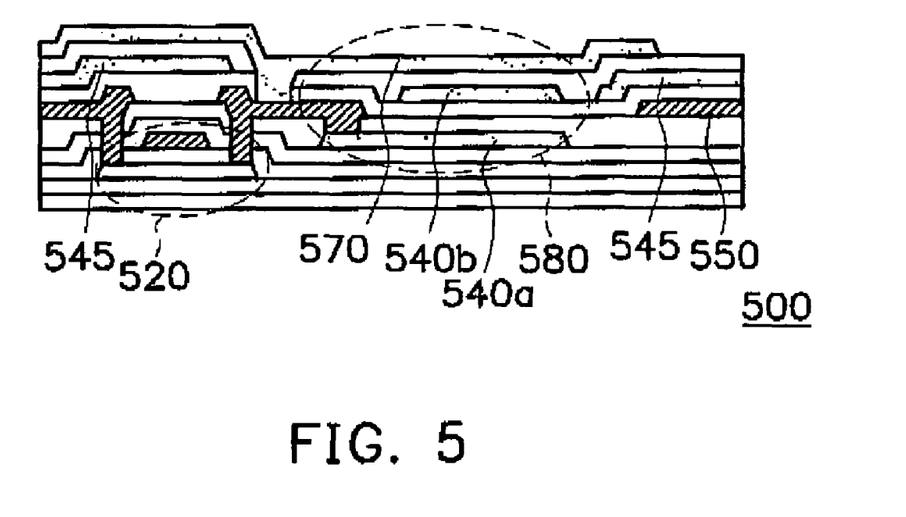
FIG. 5 is a schematic cross-sectional view showing a structure of a pixel according to a fourth embodiment of the present invention.

FIG. 5 is a schematic cross-sectional view showing a structure of a pixel according to a fourth preferred embodiment of the present invention. Referring to FIG. 5, the structure of the pixel 500 is different from the embodiments described above, in that, at least one transparent capacitor electrode 540a is included in the pixel storage capacitor 580. The electrical field shielding layer 545 is similarly disposed between the data line 550 and the pixel electrode 570. The elements similar to those described in the prior embodiments are not repeated hereinafter. The pixel 500 further comprises, for example, at least one transparent capacitor 540b disposed between the capacitor electrode 540a and the pixel electrode 570. The capacitor electrode 540a, the transparent capacitor electrode 540b and the pixel electrode 570 form the pixel storage capacitor 580. The capacitor electrode 540a is made from a transparent material. The transparent material of the transparent capacitor electrode 540b is, for example, ITO or IZO.

Moreover, the capacitor electrode 540a, for example, is directly electrically coupled to the active element 520, or electrically coupled to the active element 520 through the pixel electrode 570. Therefore, in the pixel storage capacitor 580, the capacitor electrode 540a and the pixel electrode 570, for example, have the same potential, and the transparent capacitor electrode 540b has a different potential. That can reduce the power consumption by the pixel storage capacitor 580. Surely, when a plurality of transparent capacitor electrodes 540b are applied, the capacitor electrodes electrically coupled to the active element 520 through the pixel electrode 570 can be transparent capacitor electrode 540b as long as the adjacent capacitor electrodes have different potentials.

Figure 6:
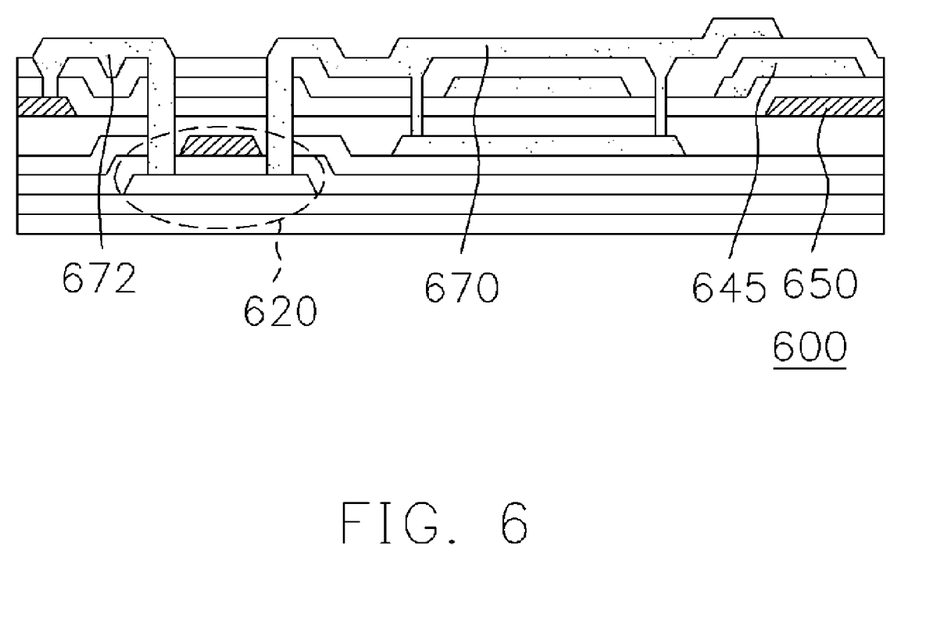
FIG. 6 is a schematic cross-sectional view showing a structure of a pixel according to a fifth embodiment of the present invention.

FIG. 6 is a schematic cross-sectional view showing a structure of a pixel according to a fifth preferred embodiment of the present invention. Referring to FIG. 6, the structure of the pixel 600 is different from the fourth embodiment described above, in that, the active element 620 and the pixel electrode 670, and the data line 650 are connected. The electrical field shielding layer 645 is similarly disposed between the data line 650 and the pixel electrode 670. The elements similar to those described in the fourth embodiment are not repeated hereinafter.

The pixel electrode 670 of the pixel 600, for example, is directly electrically coupled to the active element 620, and the data line 650, for example, is electrically coupled to the active element 620 through the conductive layer 672. In addition, the conductive layer 672 and the pixel electrode 670, for example, are formed from the same patterned transparent material layer.

It should be noted, the low temperature polysilicon thin film transistor serves as the active element in the fourth and the fifth embodiments. One of ordinary skill in the art can easily understand that an amorphous silicon thin film transistor can also used to achieve the purpose of the claimed invention, and achieve the advantages thereof.

Accordingly, the structures of the pixel and the fabricating methods of the present invention are characterized in disposing the electrical field shielding layer between the data line and the pixel electrode. Therefore, the pixel structures and the fabricating methods of the present invention can substantially reduce the impact due to the interference between the data line and the pixel electrode. Particularly, in the case of shorter separation distance between the pixel electrode and the transparent capacitor electrode for increasing the capacitance of the pixel storage capacitor. Any pixel structure and fabricating method with the features of the present invention are all included in the scope thereof. Additionally, the pixel structures and fabricating methods with the features described above can further comprise a pixel storage capacitor in the pixel structure, and the pixel storage capacitor is composed of the pixel electrode and a plurality of transparent capacitor electrodes. The pixel electrode can also be directly electrically coupled to the active element, and the data line is electrically coupled to the active element through the conductive layer.

In addition, the pixel storage capacitor is not limited to be composed of one pixel electrode and two transparent capacitor electrodes. It can comprise more than two capacitor electrodes for increasing the capacitance thereof in the same area. Furthermore, by directly coupling, or coupling through the pixel electrode a portion of the transparent capacitor electrode to the active element can reduce the number of power lines applied to the pixel storage capacitor and obtain desired capacitance. Additionally, in the second preferred embodiment, the pixel electrode is directly electrically coupled to the active element without the source/drain conductive layer. This scheme can save a photolithographic process, and thereby reducing the processing time and cost.

Accordingly, the pixel structure and fabricating method thereof have following advantages: (1) The electrical field shielding layer can effectively reduce the interference between the pixel electrode and the data line. (2) The electrical field shielding layer and one of the capacitor electrode can be formed simultaneously without increasing process steps. (3) Each capacitor electrode of the pixel storage capacitor is made from a transparent material, and thereby the aperture ratio of the pixel structure can be substantially improved. (4) The multi-layer pixel storage capacitor has the desired capacitance. (5) The pixel structure has a higher capacitance in the same area, and is adapted for high resolution liquid crystal displays. (6) The fabricating method requires a photolithographic process for forming the contact windows to connect the active element, and the pixel electrode and the data line, reducing the processing time and cost thereof.

Although the present invention has been described in terms of exemplary embodiments, it is not limited thereto. Rather, the appended claims should be constructed broadly to include other variants and embodiments of the invention which may be made by those skilled in the field of this art without departing from the scope and range of equivalents of the invention.

What is claimed is:

1. A method of fabricating a pixel structure, comprising:
    forming an active element, a scan line and a data line on a substrate, the active element being electrically coupled to the scan line and the data line;
    forming a capacitor electrode on the substrate;
    simultaneously forming a transparent capacitor electrode over the capacitor electrode and forming an electrical field shielding layer above the data line; and forming a pixel electrode over the transparent capacitor electrode, the pixel electrode electrically coupling to the active element, wherein the capacitor electrode, the transparent capacitor electrode and the pixel electrode form a pixel storage capacitor, and the electrical field shielding layer is between the data line and the pixel electrode, wherein the capacitor electrode, the electrical field shielding layer, and the pixel electrode are made from indium tin oxide or indium zinc oxide.

2. The method of fabricating a pixel structure of claim 1, wherein the active element comprises a low temperature polysilicon thin film transistor.

3. The method of fabricating a pixel structure of claim 2, while forming the data line, further comprising forming a source/drain conductive layer over the active element, wherein the active element is electrically coupled to the data line and the pixel electrode through the drain/source conductive layer.

4. The method of fabricating a pixel structure of claim 2, wherein the step of forming the active element comprises:
   forming a polysilicon layer on the substrate;
   forming a gate dielectric layer on the substrate, covering the polysilicon layer;
   forming a gate terminal on the gate dielectric layer and over the polysilicon layer; and
   forming a source/drain doped region within the polysilicon layer besides the gate terminal.

5. The method of fabricating a pixel structure of claim 4, wherein the step of forming the source/drain doped region comprises performing a doping process using the gate terminal as a hard mask for forming the source/drain doped region.

6. The method of fabricating a pixel structure of claim 2, after forming the data line, further comprising a step of forming a conductive layer over the active element, wherein the active element is electrically coupled to the data line through the conductive layer, and the pixel electrode is directly electrically coupled to the active element.

7. The method of fabricating a pixel structure of claim 1, wherein the step of forming the active element, the scan line and the data line on the substrate, the active element being electrically coupled to the scan line and the data line comprises sequentially forming the active element, the scan line and the data line on the substrate, the active element being electrically coupled to the scan line and the data line.

8. The method of fabricating a pixel structure of claim 1, wherein the capacitor electrode and the transparent capacitor electrode form a capacitor.

9. The method of fabricating a pixel structure of claim 1, wherein the transparent capacitor electrode and the pixel electrode form a capacitor.

10. The method of fabricating a pixel structure of claim 1, wherein the electrical field shielding layer shields the active element.

* * * * *